INVENTOR
ADIN D. FALKOFF
BY Francis J. Thomas
ATTORNEY

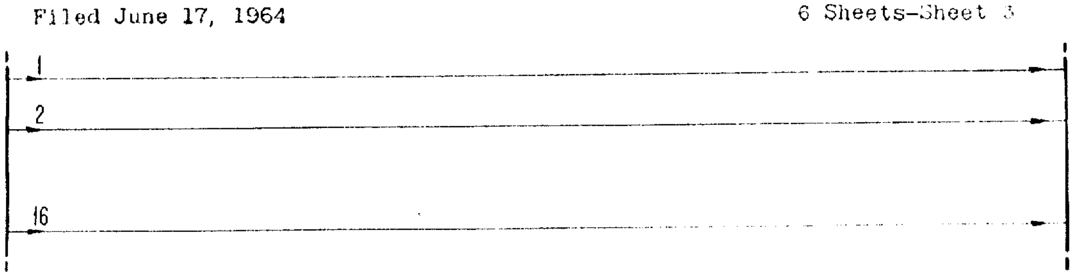
FIG. 2B
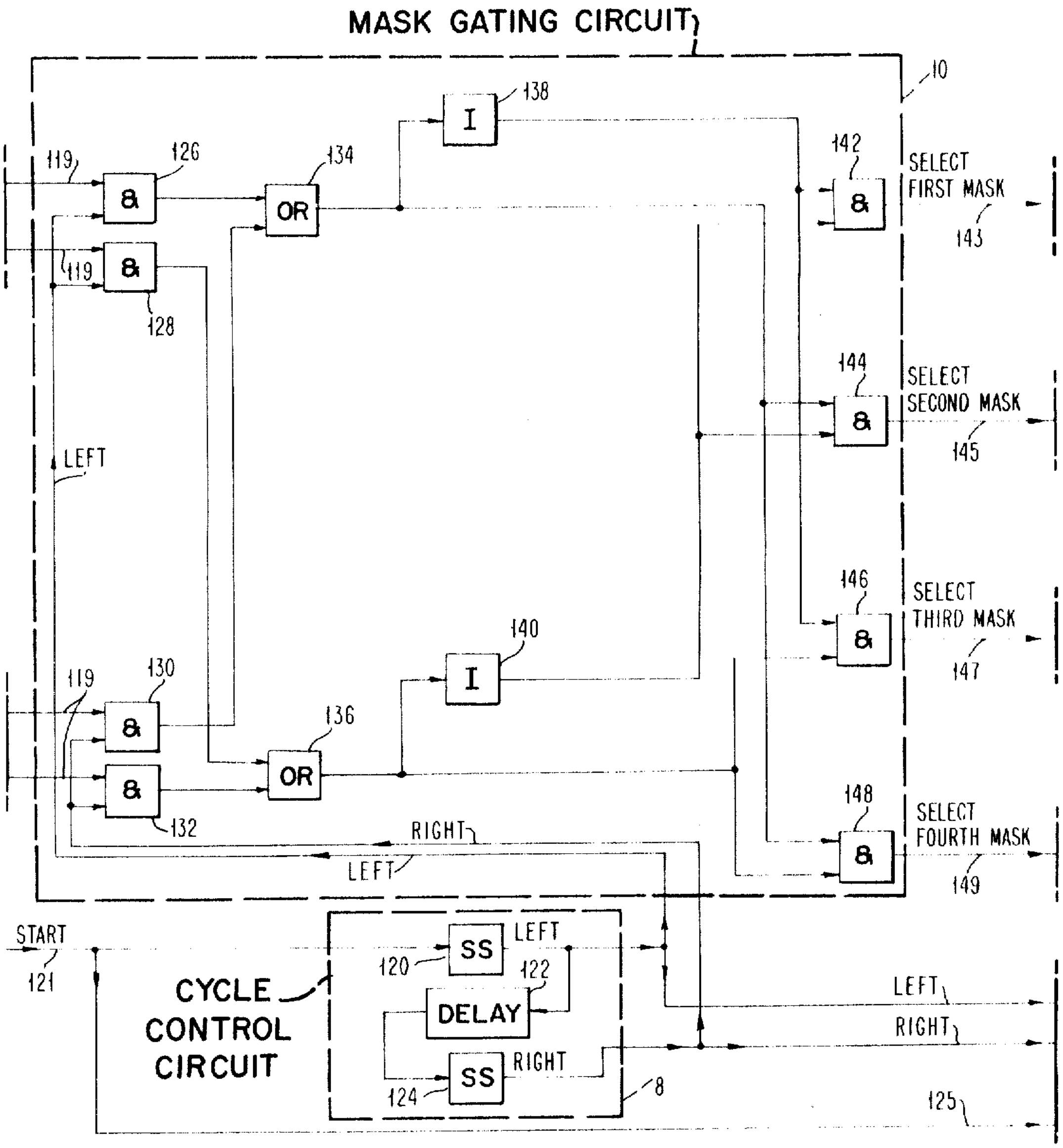

United States Patent Office 3,366,927
Patented Jan. 30, 1968

3,366,927
COMPUTING TECHNIQUES

Adin D. Falkoff, Croton-on-Hudson, N.Y., assignor to International Business Machines Corporation, New York, N.Y., a corporation of New York Filed June 17, 1964, Ser. No. 375,704
1 Claim. (Cl. 340—172.5)

This invention pertains to addressing techniques for use with computer memories.

The conventional digital computer memory stores data at predetermined locations corresponding to specific addresses. That is, when data is applied to (written) or removed from (read) the memory, a particular memory location (address) is specified. In many applications, it is desirable to assign addresses as some function of the data to be stored. For example, in an inventory control system where the number of inventory items for each key (e.g., part number) is to be monitored, the addresses may correspond to the keys themselves, or to some function of the keys, and the data that is stored at the addresses may correspond to the number of inventory items having the corresponding key. That is, if 17 items are on hand having part number (key) 2649, the data 17 may be stored at address 2649 in the memory. In many instances, the total set of keys is relatively sparse or incomplete. For example, a parts distributor may maintain an inventory of only 2,000 different parts that are selected from 100,000 parts that are available from the manufacturer. In this case, if the manufacturers assigned five-digit part numbers, and the part numbers were used directly as memory addresses, 100,000 memory locations would have to be reserved, even though only 2,000 locations contain data. This relatively sparse set of keys would result in an inefficient use of the computer memory where 49 locations out of 50 were idle. This direct use of keys for addresses is often more inefficient, such as when the manufacturer's set of part numbers is, in itself, sparse. For example, a manufacturer of 100,000 parts may use seven digit numbers (which could described 10 million different parts). In the example of a distributor who stocks only 2,000 parts, the direct use of the keys (part numbers) for addresses will result in only one memory location out of 5,000 being used.

Various known addressing techniques provide a more efficient use of memory than is obtained by using the keys directly as addresses. However, these techniques inherently convert more than one key to the same address, because any method which converts a large unique set of numbers into a smaller set of numbers must introduce the possible loss of uniqueness. In the above example, if seven-digit keys are converted into four-digit addresses, the average address corresponds to 1,000 keys. However, four-digit addresses can accommodate 10,000 entries and, in the example, only 2,000 different parts are stocked by the distributor, so a well-selected addressing technique would provide a low number of non-unique addresses. The problem of non-unique address generation is reduced by increasing the number of memory locations that are used (for example, using 100,000 rather than the 10,000 locations for storing the 2,000 items), but this reduces the efficiency of the memory system. Although minimized, the possibility of non-uniqueness always exists and can be compensated for by secondary addressing techniques, such as the "chaining" technique, wherein a portion of each memory location contains a secondary address field to detour data having a duplicate address to another vacant address.

Although various techniques exist which compensate for the generation of non-unique addresses, the basic problem resides in the selection of an addressing technique which produces a minimum number of non-unique addresses. In general, the uniqueness of the generated addresses is directly related to the randomness of the addressing technique. An example of a nonrandom technique is the simple method of reducing seven-digit keys to four-digit keys by adding adjacent pairs of numbers and disregarding carriers: that is, the key 2146309 can be converted to 2599 by:

```
2 1 6 0
  4 3 9
-------
2 5 9 9
```

However, with a nonrandom set of keys, such as one containing a string of numbers between 2146300 and 2146325, the address 2599 would also be produced for key 2146318.

Highly-random techniques are known, but they are generally complicated and require complex circuitry. For example, the seven-digit key can be squared or cubed and four predetermined digits in the result can be selected as the address.

In addition to a high degree of randomness, an addressing technique should contain flexibility so that the conversion algorithm is alterable to compensate for the structure of the key set. That is, if one conversion algorithm tends to produce bunching (non-unique addresses), then other algorithms should be readily substitutable.

The inventive addressing technique provides highly random addresses with a relatively simple apparatus whose conversion algorithm is readily alterable.

In the present invention, a portion of the key is used to select one of a group of masks. The selected mask then controls the selection of a portion of the key as at least part of the final address. Other portions of the key can also be used to select masks which control the selection of portions of the key to provide the remainder of the final address.

The following example illustrates this procedure for generating a six-bit address in two 3-bit cycles from the 16-bit binary key:

1011010011101100

Two bits of this key are used to select one of four 16-bit binary masks, each containing three "1" bits (to correspond to the three address bits which are generated during a cycle) and thirteen "0" bits. The two bits can be randomly selected or picked in any manner, such as according to a trial and error procedure based on the uniqueness of the final addresses that are produced for the particular keys. Obviously, the same selected bits are used for the entire key set to permit data to be retrieved. For example, the third and eleventh bits of the key can be selected, resulting in the binary number 11, which is to be used to select one of four predetermined masks:

| Mask Number | Selected by | Mask |
|---|---|---|
| 1 | 00 | 0010001000010000 |
| 2 | 01 | 0000011000000010 |
| 3 | 10 | 0100100010000000 |
| 4 | 11 | 0000010001000001 |

Thus, the binary mask select number 11 causes the fourth mask to be selected. The masks are randomly generated or selected in any other manner but, obviously, the same masks are used for the entire key set.

The fourth mask indicates that the sixth, tenth and sixteenth bits of the key are to be selected or a portion of the final address. Thus, in the example, a particular address of 110 is generated. This process is repeated to generate a second three bits of the address. During the second cycle, a different pair of bits within the key can be used to select a mask. For example, the fifth and tenth bits of the key can be selected resulting in the binary number 01. Thus, the second mask is selected, indicating that the remainder of the address is comprised of the sixth, seventh and fifteenth bits of the key, namely, 100, resulting in a final address of 110100.

A variation of this procedure which is employed in the preferred embodiment of the invention to further enhance the versatility of the system enables the selected mask to control the sequence of the key bits that form the address. That is, a mask not only selects bits of the key, but specifies their order. In the example, the left half of the resultant address (110) was obtained by using the fourth mask which selected the sixth, tenth and sixteenth bits of the key in that order. In the preferred embodiment of the invention, the order is specified. For example, the mask can specify that the tenth bit of the key is to form the first bit of the address, the sixteenth bit of the key is to form the second bit of the address, and the sixth bit of the key is to form the third bit of the address. In a similar manner, the right side of the address can be sequence controlled. The preferred embodiment of the invention has still greater versatility in that it permits the same bit of the key to be used for more than one bit of the address. That is, the left side of the address can be specified as the fourth bit of the key, followed by the ninth bit of the key, followed by the ninth bit of the key, followed by the fourth bit of the key. In one embodiment of the invention, another dimension of versatility is achieved by utilizing a conversion memory which takes the selected bits of the key and, instead of using them directly as the final address, uses them to address an intermediate memory which selects the first address bits.

Although the addressing techniques are shown, by way of example, with four masks that select three bits of the key for each half of the address, any number of masks can be employed and any number of bits of the key can be selected. Furthermore, the address need not be generated in two halves, but rather many be generated by a single masking operation or by three or more operations. Obviously, when the address is generated in portions, the first portion that is generated need not be used as the left portion of the address.

The inventive technique provides for highly random address generation as the mask select data and the masks themselves can be generated either randomly or by some other suitable process. Since the technique is extremely versatile, in that when the structures of the key set and the masks provide bunching (non-unique addresses), the bits of the key that are used to select the masks as well as the masks themselves can be altered, a good set of masks and selectors can easily be determined empirically for any particular set of keys. The technique is also simple, requiring a modest amount of apparatus because simple binary logic operations are used and no complex arithmetic is performed. For the same reason, it is very fast and can be used in the addressing of data without materially slowing down the overall operation, as is inherent in methods requiring complex arithmetic.

Thus, an object of the present invention is to provide memory addressing techniques.

A further object is to show techniques for generating key-dependent, memory addresses.

Another object is to provide techniques for randomly-generating memory addresses.

Another object is to provide versatile techniques for generating key-dependent memory addresses, where the dependence upon the key is alterable.

A further object is to provide a key-dependent, memory addressing technique wherein the address is a function of selected elements of the key.

A further object is to provide a key-dependent memory addressing technique wherein elements of the key control the selection of masks which, in turn, control the selection of elements of the key to form part or all of the address.

A further object is to provide a key-dependent, memory addressing technique wherein predetermined elements of the key control the selection of masks having predetermined elements which, in turn, control the selection of elements of the key to form part or all of the address.

Another object of the invention is to provide a key-dependent, memory addressing technique wherein alterably-selectable elements of the key control the selection of masks having alterable elements which, in turn, control the selection of elements of the key to form part or all of the address.

A further object is to provide a key-dependent, memory addressing technique wherein the address is comprised of a plurality of portions, each generated by selecting elements of the key to control the selection of masks which, in turn, control the selection of elements of the key as a portion of the address.

A still further object is to provide a key-dependent main memory addressing technique wherein elements of the key control the selection of masks which, in turn, control the selection of elements of the key as the address of an intermediate memory which then decodes this address to provide part or all of the main memory address.

The foregoing and other objects, features and advantages of the invention will be apparent from the following more particular description of preferred embodiments of the invention, as illustrated in the accompanying drawings.

In the drawings:

FIG. 2 is a diagram showing the relationship of FIGS. 2A through FIGS. 2E.

FIGS. 2A through 2E are detailed diagrams of the preferred embodiment of the invention.

Figure 1:
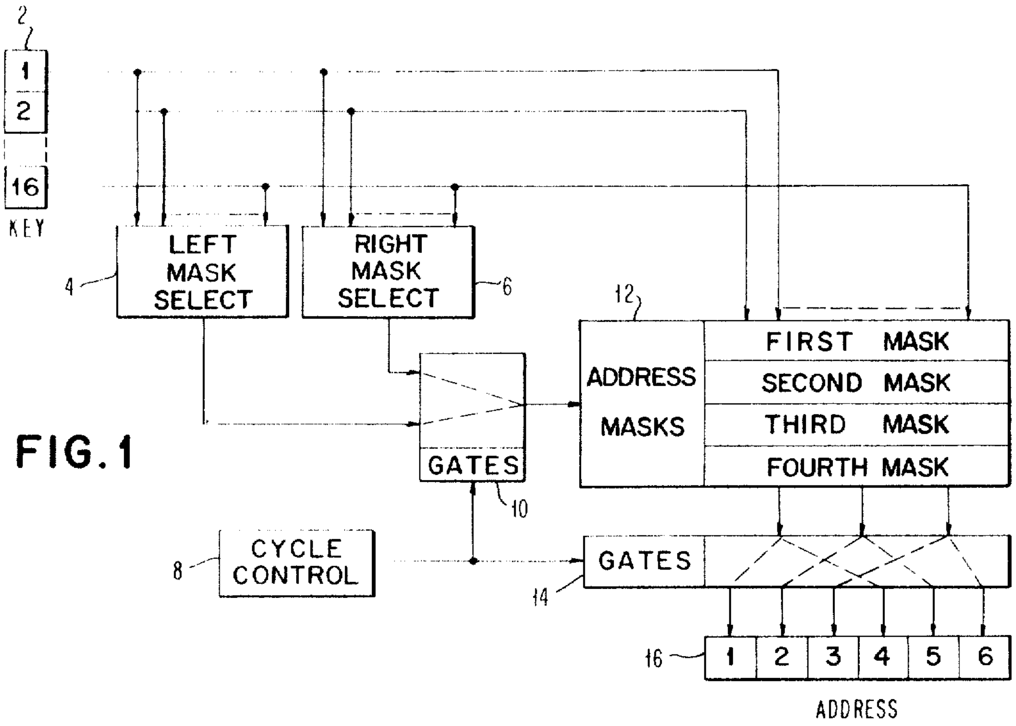
FIG. 1 is a block diagram of the preferred embodiment of the invention.

In the preferred embodiment of the invention, as shown in FIG. 1, a 16-bit binary key is stored in a register 2. A left mask select circuit 4 and a right mask select circuit 6 are responsive to the key and each develops output data which controls the selection of address masks. A cycle control circuit 8 conditions a gating circuit 10 to cause it to select the data from the left mask select circuit 4 during a first cycle of operation and the data from the right mask select circuit 6 during a second cycle. Four masks are stored in an address mask circuit 12. The mask select data from gating circuit 10 conditions one of the four masks during each of the two (left and right) cycles. The masks respond to the key (in register 2) to select three bits of the key as a portion of the address. The selected bits are applied to a gating circuit 14 which is under the control of the cycle control unit 8. During the first (left) cycle, the gates feed the three address bits to the first three (1, 2, 3) positions of an address register 16. In the second (right) cycle of operation, the three address bits are applied to the remaining positions (4, 5, 6) of the address register. Thus, half of a 6-bit address is developed from the 16-bit key during each of two cycles of operation. The mask select circuits 4 and 6 and the address masks 12 are alterable to provide a high degree of randomness and versatility with a relatively simple apparatus. The preferred embodiment of the invention is shown in detail in FIGS. 2A–2E. For clarity of exposition, most reference numerals in FIG. 1 have a corresponding use in FIG. 2.

Figures 2, 2A:
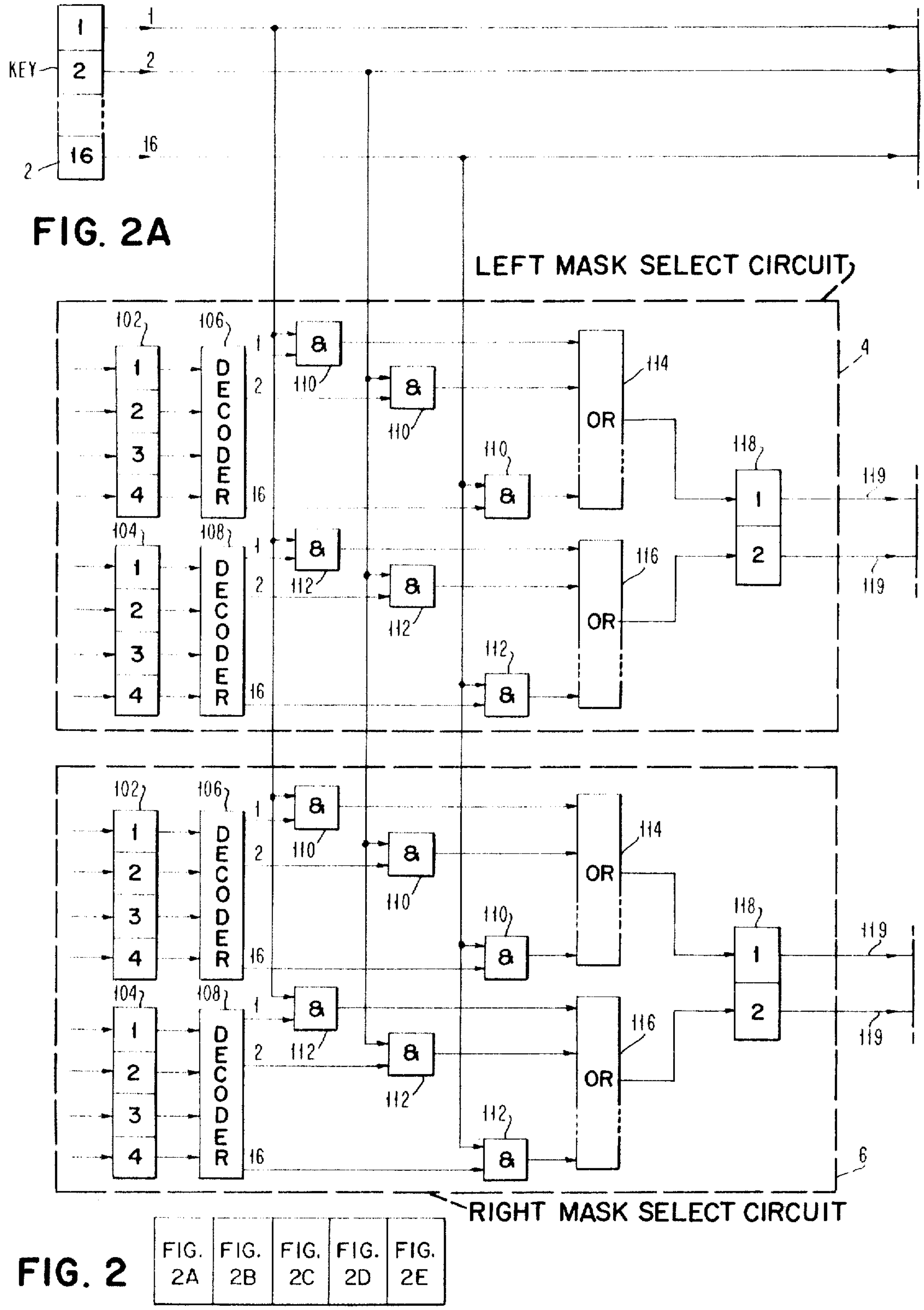

The key is stored in register 2 in FIG. 2A and is applied to the left and right mask select units 4 and 6 (FIG. 2A). Each mask select unit contains two 4-bit registers 102 and 104 which store the key bit positions which are to be used in selecting address masks. For example, when the right mask select circuit registers 102 and 104 contain the binary data 1011 and 0011, respectively, the eleventh and third bits of the key are used as the first and second bits, respectively, of the right mask select data. Input leads are connected to registers 102 and 104 to permit the mask select data to be altered for greater system flexibility. The data in registers 102 and 104 is applied to conventional diode decoders 106 and 108 which provides a signal on the one of its sixteen output leads that correspond to the data stored in the register except that the sixteenth output lead is selected by 0000. The signal provided by each decoder conditions a corresponding AND gate 110. The second input to each of the AND gates is supplied by one of the 16 bits in key register 2 such that each conditioned AND gate passes the appropriate bit of the key. The outputs of each group of AND gates (which corresponds to a decoder) is applied through an OR gate 114, 116 to a register 118. Only one AND gate in each group is conditioned as described above. Thus, each register 118 contains two bits of data which have been selected from the key under the control of registers 102 and 104.

The data in each register 118 controls the selection of one of four address masks. This data is applied on leads 119 to the mask gating circuit 10 in FIG. 2B where "left" and "right" signals from the cycle control circuit 8 (FIG. 2B) cause the data in the registers to be sequentially sensed. A start signal is applied on a lead 121 to the cycle control circuit 8 (FIG. 4B) to initiate the operation of a single-shot pulse generator 120, which provides the "left" cycle control signal. The "left" signal is applied through a delay circuit 122 to another single-shot pulse generator 124 which, in turn, develops the "right" cycle control signal, at a later time. The delay insures that the operation of the circuits that are controlled by the "left" signal is complete before the operation of the circuits that are controlled by the "right" signal is begun. The "start" signal is also applied on a lead 125 to reset the address register 16 in FIG. 2D.

A pair of AND gates 126 and 128 in the mask gating circuit 10 is conditioned by the "left" signal to pass the data in register 118 in the left mask select circuit 4 (FIG. 2A). Subsequently, a pair of AND gates 130 and 132 (FIG. 2B) is conditioned by the "right" signal to pass the data in register 118 in the right mask select circuit 6 (FIG. 2A). The data that is passed by AND gates 126 and 130 (FIG. 2B) is applied to an OR gate 134 and the data that is passed by AND gates 128 and 132 is applied to an OR gate 136. Thus, the output of OR gate 134 represents the data in the first position of that register 118 (FIG. 2A) whose output is selected by the cycle control unit 8 (FIG. 2B). Similarly, the output of OR gate 136 represents the data in the second position of the sampled register 118 (FIG. 2A). That is, during the first (left) cycle, the outputs of OR gates 134 and 136 (FIG. 2B) represent the data in the first and second positions, respectively, in register 118 (FIG. 2A) in the left mask select unit 4, and during the second (right) cycle, the outputs of OR gates 134 and 136 (FIG. 2B) represent the data in register 118 in the right mask select circuit 6 (FIG. 2A).

The signals provided by OR gates 134 and 136 (FIG. 2B) are decoded by a pair of inverters 138 and 140 and a group of four AND gates 142, 144, 146, and 148. Only one of the four AND gates provides an output at any time. When both OR gates 134 and 136 provide no signals (corresponding to the binary number 00 in the selected register 118 in FIG. 2A), inverters 138 and 140 (FIG. 2B) develop signals to operate AND gate 142 which, in turn, generates the "select first mask" signal on a lead 143. When OR gate 134 provides a signal and OR gate 136 does not provide a signal (corresponding to the binary number 01), the signal from OR gate 134 and a signal developed by inverter 140 cause AND gate 144 to generate the "select second mask" signal on a lead 145. When OR gate 134 provides no signal and OR gate 136 provides a signal (corresponding to the binary number 10), the signals from OR gate 136 and inverter 138 cause AND gate 146 to generate the "select third mask" signal on a lead 147. Finally, when both OR gates 134 and 136 provide signals (corresponding to the binary number 11), these signals cause AND gate 148 to generate the "select fourth mask" signal on a lead 149. Thus, the 2-bit binary signal at the outputs of OR gates 134 and 136 is decoded to produce one of the four "select mask" signals. A decoder of this type (extended to handle four inputs and sixteen outputs) is obviously also suitable for use in decoders 106 and 108 (FIG. 2A).

Figure 2C:
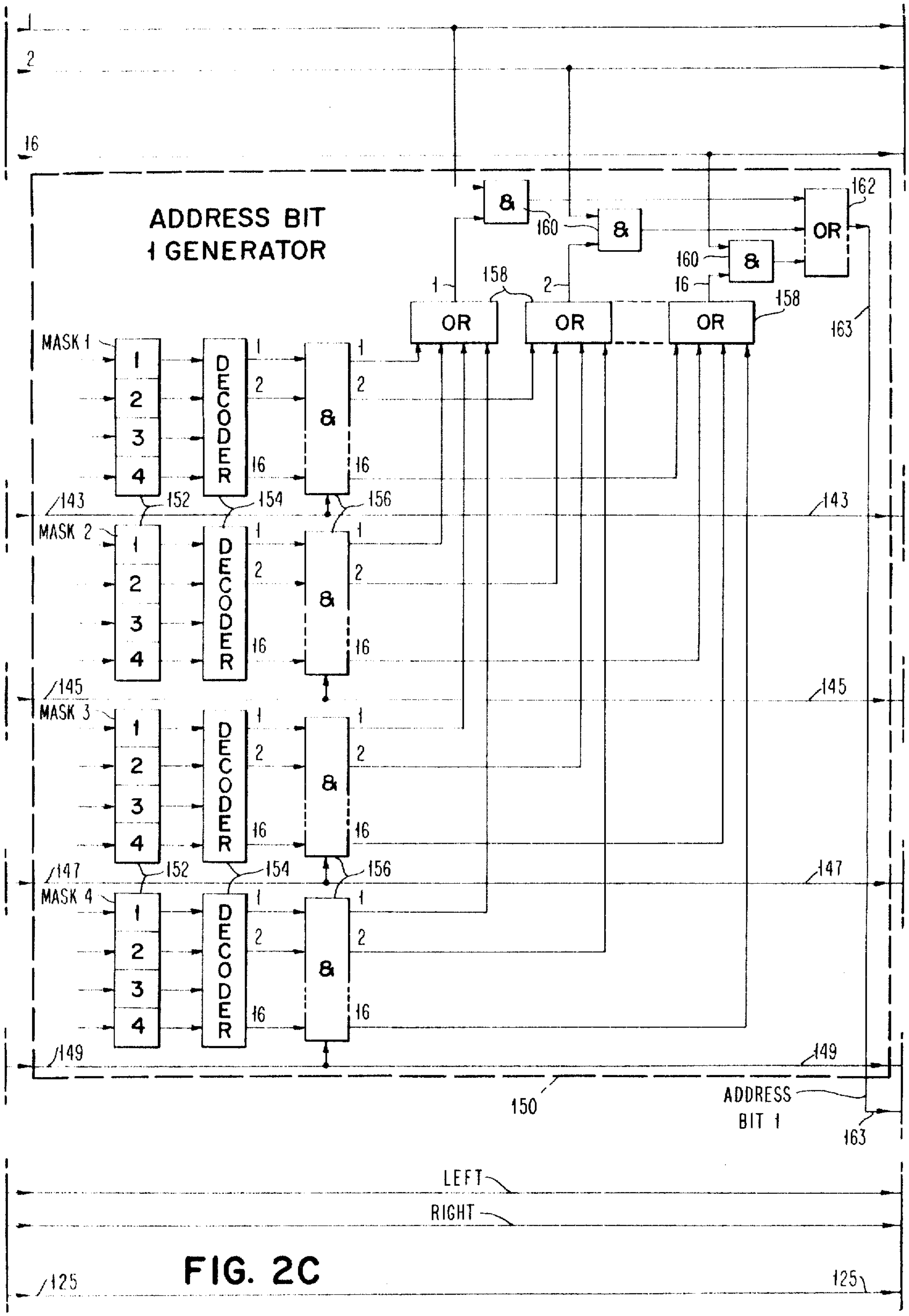
Figure 2D:
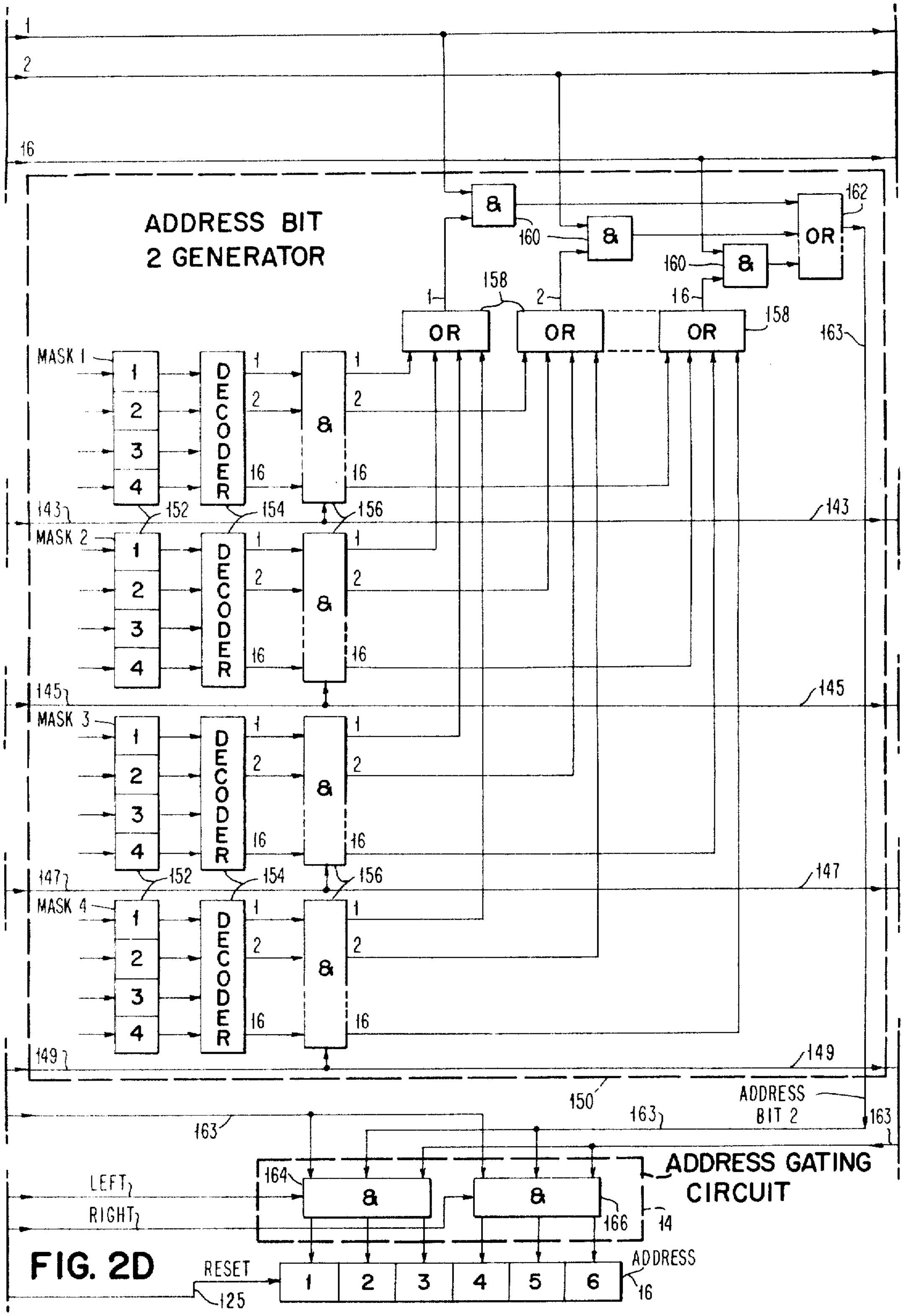
Figure 2E:
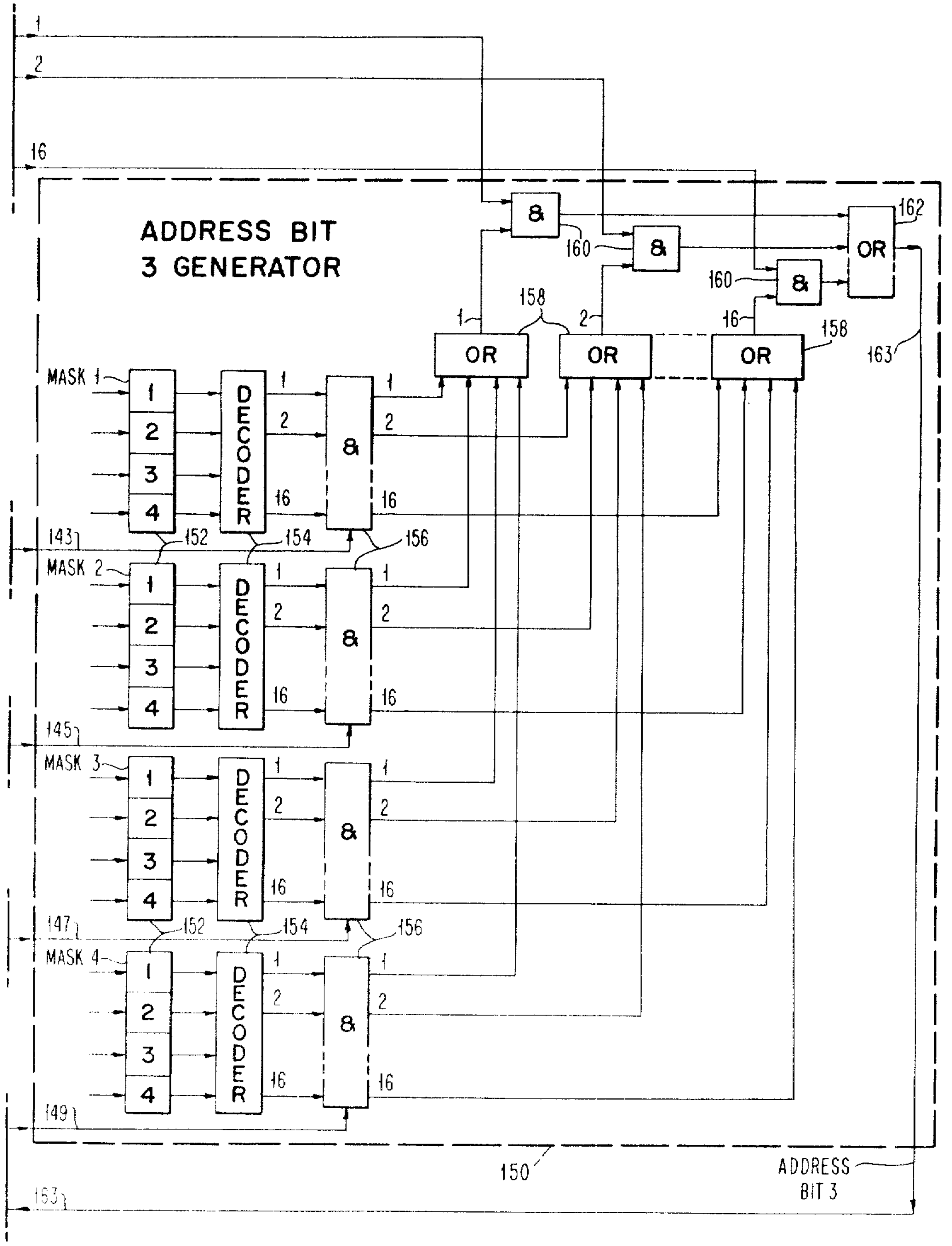

The "select mask" signals are applied on leads 143, 145, 147, and 149 to three address bit generators 150, one of which is shown on each of FIGS. 2C, 2D, and 2E. Each address bit generator contains four mask registers 152, one of which corresponds to each of the four masks. Thus, one entire mask is comprised of the data in three mask registers 152, one of which is contained in each address bit generator 150. Each mask register 152 contains a 4-bit binary number whose value corresponds to the bit position within the key which is to be selected for the address (where 0001 selects the first bit position, 0010 selects the second bit position, . . . , 1111 selects the fifteenth bit position, and 0000 selects the sixteenth bit position). Extreme versatility is achieved by the use of alterable mask registers.

The 4-bit mask data in each register 152 is applied through a decoder 154 to a multiple AND gate 156. The decoders are identical in operation to decoders 106 and 108 (FIG. 2A), providing a signal on one of sixteen output leads determined by the value in the associated register 152. The "select mask" signal that is provided by the mask gating circuit 10 (FIG. 2B) conditions the corresponding AND gate 156 in each address bit generator 150. Each multiple AND gate 156 contains 16 conventional AND gates, each of which is conditioned by the same signal ("mask select" signal), but a single block is shown to simplify the diagram. In each address bit generator, the outputs of the AND gates are combined in sixteen OR gates 158. The "1" outputs of all four AND gates 156 are combined in the OR gate 158 which develops the "1" output signal, the "2" outputs of all AND gates are combined in the OR gate which develops the "2" output signal, etc. Thus, only one OR gate 158 in each address bit generator 150 provides an output, and that OR gate corresponds to the data in the mask register 152 which is selected by the "mask select" signal. Each OR gate output conditions an AND gate 160 which, in turn, passes the corresponding bit of the key (from register 2 in FIG. 2A) to an OR gate 162. The data in the selected positions of the key are passed by the three OR gates 162 to the address gating circuit 14 (FIG. 2D) on leads 163. During the first (left) cycle of operation, this data is passed by a multiple AND gate 164 (which is conditioned by the "left" signal for the cycle control circuit 8 in FIG. 2B) as the left portion of the address and the data is stored in positions 1, 2, and 3 of the address register 16. During the second (right) cycle, the data from OR gates 162 is applied through a multiple AND gate 166 as the right portion of the address and is stored in positions 4, 5, and 6 of the address register. Multiple AND gates 164 and 166 comprise three conventional AND gates, each of which is conditioned by a common ("left" or "right") signal.

Thus, the preferred embodiment of the invention, as described with respect to FIGS. 1 and 2, provides a 6-bit address from a 16-bit key during two cycles of operation. The data in registers 102 and 104 (FIG. 2A) and the data in register 152 (FIGS. 2C, 2D, and 2E) is alterable to provide a highly versatile system which can accommodate any set of keys. Obviously, the size of the address, and the number of cycles can be varied in accordance with the type of addressing problem which is presented.

Figure 3:
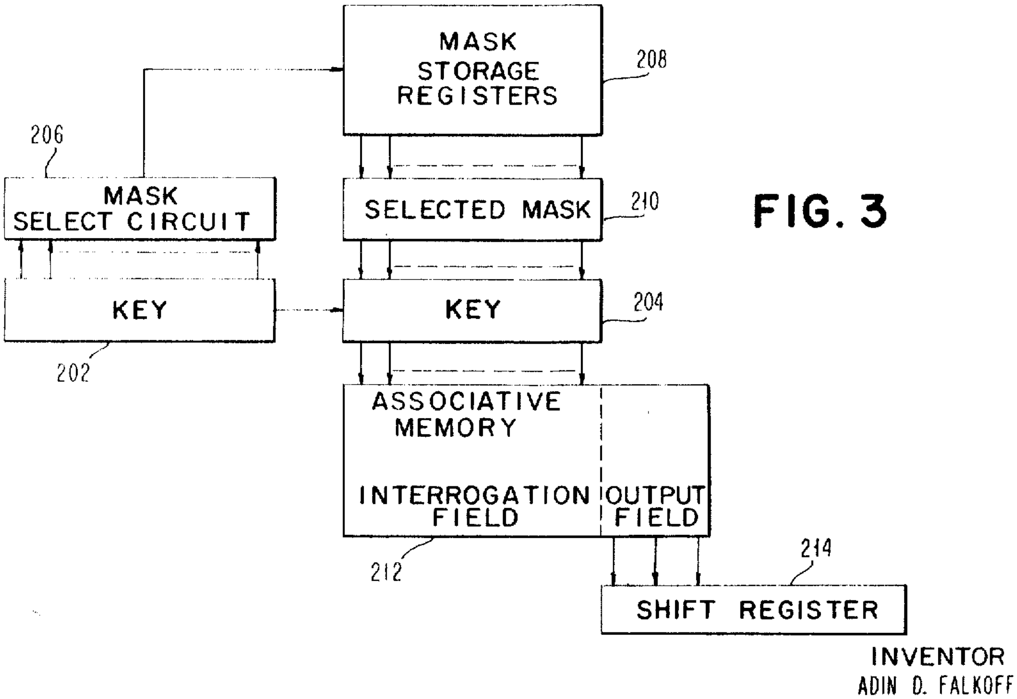
FIG. 3 is a diagram of a second embodiment of the invention.

A second embodiment of the invention is shown in FIG. 3. In this embodiment, the 16-bit key is separately stored in two registers 202 and 204. A mask select circuit 206 gates predetermined bits of the key to select one of four 16-bit mask storage registers 208 for storage in a register 210. Each mask contains three "1" bits and thirteen "0" bits. The key (in register 204) is masked by the data in register 210 and the three key bits whose positions correspond to three "1" bits in the selected mask are passed to an interrogation field of a conventional associative memory 212. The thirteen "0" bits in the mask provide no outputs (or "don't care" outputs). The interrogation field of the associative memory contains eight 16-bit words and the output field contains eight 3-bit words. For example, the associative memory can contain the following data:

The interrogation field row whose selected columns contain data matching the data from key register 204 provides a 3-bit output data word from the output field. In the example in the last paragraph, the lowest row provided a match, so the output 000 is produced. This word is applied to a shift register 214 as a portion of the address and is shifted to the right to permit the subsequently-generated portion of the address to enter the shift register. At the termination of a selected number of cycles, the entire address is present in the shift register. The mask select circuit 206 enables different key bits to cause different masks to be selected during each cycle, for greater versatility.

INTERROGATION FIELD

| 1 | 2 | 3 | 4 | 5 | 6 | 7 | 8 | 9 | 10 | 11 | 12 | 13 | 14 | 15 | 16 | Output Field |
|---|---|---|---|---|---|---|---|---|---|---|---|---|---|---|---|---|
| 1 | 1 | 1 | 0 | 0 | 0 | 1 | 1 | 1 | 0 | 0 | 0 | 1 | 1 | 1 | 0 | 111 |
| 1 | 1 | 0 | 0 | 0 | 1 | 1 | 1 | 0 | 0 | 0 | 1 | 1 | 1 | 0 | 0 | 110 |
| 1 | 0 | 1 | 0 | 1 | 0 | 1 | 0 | 1 | 0 | 1 | 0 | 1 | 0 | 1 | 0 | 101 |
| 1 | 0 | 0 | 0 | 1 | 1 | 1 | 0 | 0 | 0 | 1 | 1 | 1 | 0 | 0 | 0 | 100 |
| 0 | 1 | 1 | 1 | 0 | 0 | 0 | 1 | 1 | 1 | 0 | 0 | 0 | 1 | 1 | 1 | 011 |
| 0 | 1 | 0 | 1 | 0 | 1 | 0 | 1 | 0 | 1 | 0 | 1 | 0 | 1 | 0 | 1 | 010 |
| 0 | 0 | 1 | 1 | 1 | 0 | 0 | 0 | 1 | 1 | 1 | 0 | 0 | 0 | 1 | 1 | 001 |
| 0 | 0 | 0 | 1 | 1 | 1 | 0 | 0 | 0 | 1 | 1 | 1 | 0 | 0 | 0 | 1 | 000 |

The configuration of the masks in registers 208 is somewhat restrained in that the three "1" bits in the mask occur at positions which correspond to three columns in the associative memory interrogation field that contain unique data. For example, columns 2, 4, and 15 in the associative memory contain:

COLUMNS

| 2 | 4 | 15 |
|---|---|---|
| 1 | 0 | 1 |
| 1 | 0 | 0 |
| 0 | 0 | 1 |
| 0 | 0 | 0 |
| 1 | 1 | 1 |
| 1 | 1 | 0 |
| 0 | 1 | 1 |
| 0 | 1 | 0 |

These eight 3-bit words are unique and, hence, a mask can contain its three "1" bits in columns 2, 4, and 15. With the associative memory that is illustrated above, all masks have a "1" bit in columns 1, 4, 7, 10, 13, or 16; another "1" bit in columns 2, 5, 8, 11 or 14 and another "1" bit in columns 3, 6, 9, 12, or 15. Obviously, the data in the interrogation field of the associative memory can be altered to permit different mask configurations. A large number of permissible mask configurations is achieved by filling three interrogation field columns with unique 3-bit words and filling the remaining columns with duplicates or reversed duplicates of these three columns. In the above-illustrated associative memory, columns 1, 2, and 3 contain unique 3-bit words and each of columns 4–16 are identical to or reversed versions of one of columns 1, 2, 3.

Since the mask configurations are limited to those which select these columns which contain unique 3-bit words, the 3-bit output of key register 204 matches one and only one row of the interrogation field. For example, a mask with "1" bits in columns 2, 4, and 15 operates on key:

1011001110110001 to generate:

X0X1XXXXXXXXXX0X where "X" signifies no output or a "don't care" output. This latter pattern is compared to the data in the interrogation field of the above-illustrated associative memory and provides a match with the bottom word (and with no other word).

For simplicity of explanation, separate registers 202 and 204 are shown in FIG. 3. Their function can be performed by a single register. Similarly, register 210 can be eliminated and its function performed by the selected register 208.

Although the embodiment of FIG. 3 is somewhat constrained with respect to the masks, the data in the associative memory is alterable, providing an extremely flexible system. In effect, the embodiment shown in FIG. 3 causes the key to be masked to generate an "address" for the mask storage registers 208. The data in the selected register then masks the key to generate an "address" for an intermediate (associative) memory 212. The associative memory output, in turn, is used as the system output address. This three-level addressing technique permits three degrees of system modification: the mask select circuit 206 and the contents of the mask storage registers 208 and the associative memory 212 are replaceable to provide a flexible system which can be adapted to provide optimum operation for key sets with various structures.

The present invention provides addressing techniques for converting keys to addresses. The techniques are embodied in versatile systems which permit modification to adapt to sets of keys having various structures. In addition, a high-speed, economical system is provided which employs a simple logic circuitry.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for converting an applied key to an address comprising, in combination:

a key register for storing the key;

a plurality of left mask registers, each containing a predetermined indication corresponding to a data position within the key register;

a plurality of right mask registers, each containing a predetermined indication corresponding to a data position within the key register;

a plurality of left mask select circuits, each corresponding to a left mask register and each responsive to the data in the key register and to the data in the corresponding left mask register, for selecting the data in the key register at the positions indicated by the data in the corresponding left mask register as a left mask select indication;

a plurality of right mask select circuits, each corresponding to a right mask register and each responsive to the data in the key register and to the data in the corresponding right mask register, for selecting the data in the key register at the positions indicated by the data in the corresponding right mask register as a right mask select indication;

a left select mask register responsive to the left mask select indication for storing this indication;

a right select mask register responsive to the right mask select indication for storing this indication;

a cycle control circuit for sequentially producing a left signal and a right signal;

a mask gating circuit, responsive to the left and right signals from the cycle control circuit and to the left and right mask select indications from the left and right mask select registers, for selecting the left mask select indication as a resultant mask select indication when the left signal is present and for selecting the right masks select indication as the resultant mask indication when the right signal is present;

a plurality of mask circuits, each corresponding to a different resultant mask select indication and each comprising a plurality of mask registers, where each mask register contains a predetermined indication corresponding to a data position within the key register;

a resultant mask select circuit, responsive to the resultant mask select indication and to the data in the mask registers, for selecting the data in the mask registers that corresponds to the select mask indication as a resultant mask indication;

an address data select circuit responsive to the data in the key register and to the resultant mask indication, for selecting the data in the key register at the positions indicated by the resultant mask indication as address data for a portion of the address;

an address register comprising a left portion and a right portion;

and address gating means, responsive to the address data from the address data select circuit and responsive to the left and right signals in the cycle control circuit, for placing the address data into the left portion of the address register when the left signal is present and for placing the address data in the right portion of the address register when the right signal is present.

References Cited

UNITED STATES PATENTS

| | | | |
|---|---|---|---|
| 3,119,098 | 1/1964 | Meade | 340—172.5 |
| 3,195,109 | 7/1965 | Behnke | 340—172.5 |
| 3,221,308 | 11/1965 | Petersen et al. | 340—172.5 |
| 3,267,433 | 8/1966 | Falkoff | 340—172.5 |
| 3,270,324 | 8/1966 | Meade et al. | 340—172.5 |
| 3,303,477 | 2/1967 | Voigt | 340—172.5 |
| 3,311,887 | 3/1967 | Muroga | 340—172.5 |
| 3,311,888 | 3/1967 | Hanan et al. | 340—172.5 |
| 3,315,233 | 4/1967 | Campo et al. | 340—172.5 |

OTHER REFERENCES

Jeenel, Programming for Digital Computers, McGraw-Hill, 1959, pp. 19, 20 and 283–286.

ROBERT C. BAILEY, *Primary Examiner.*

R. RICKERT, *Assistant Examiner.*